United States Patent
Saruwatari et al.

(10) Patent No.: US 8,334,074 B2
(45) Date of Patent: Dec. 18, 2012

(54) NONAQUEOUS ELECTROLYTE SECONDARY BATTERY HAVING A NEGATIVE ELECTRODE COMPRISING A LITHIUM-CONTAINING PHOSPHOROUS OXIDE, A BATTERY PACK AND VEHICLE CONTAINING THE BATTERY

(75) Inventors: Hidesato Saruwatari, Kawasaki (JP); Norio Takami, Yokohama (JP); Hiroki Inagaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/197,141

(22) Filed: Aug. 3, 2011

(65) Prior Publication Data

US 2012/0028106 A1 Feb. 2, 2012

Related U.S. Application Data

(63) Continuation of application No. PCT/JP2010/051518, filed on Feb. 3, 2010.

(30) Foreign Application Priority Data

Feb. 3, 2009 (JP) .................................. 2009-022663

(51) Int. Cl.
*H01M 4/13* (2010.01)
(52) U.S. Cl. ................ 429/231.95; 429/209; 429/218.1; 429/223; 429/231.5
(58) Field of Classification Search .......................... None
See application file for complete search history.

(56) References Cited

U.S. PATENT DOCUMENTS

| | | | |
|---|---|---|---|
| 7,858,234 B2 | 12/2010 | Morishima et al. | |
| 7,923,152 B2 | 4/2011 | Inagaki et al. | |
| 7,927,740 B2 | 4/2011 | Inagaki et al. | |
| 2009/0081534 A1 * | 3/2009 | Takami et al. | 429/149 |

FOREIGN PATENT DOCUMENTS

| | | |
|---|---|---|
| JP | 2001-23629 | 1/2001 |
| JP | 2005-135775 | 5/2005 |
| JP | 2006-66341 | 3/2006 |
| JP | 2008-91326 | 4/2008 |
| JP | 2008-243612 | 10/2008 |
| JP | 2010-9898 | 1/2010 |
| WO | WO 2009/124894 | * 10/2009 |

OTHER PUBLICATIONS

Son et al., Nanoparticle iron-phosphate anode material for Li-ion battery, 2004, Applied Physics Letters, 85, 5875-5877.*
Shinichiro Kosugi, et al., "Newly Developed SCiB™ High-Safety Rechargeable Battery" Feature Articles, vol. 63, No. 2, 2008, (pp. 54-57).

* cited by examiner

*Primary Examiner* — Barbara Gilliam
*Assistant Examiner* — Kwang Han
(74) *Attorney, Agent, or Firm* — Oblon, Spivak, McClelland, Maier & Neustadt, L.L.P.

(57) ABSTRACT

According to one embodiment, a nonaqueous electrolyte secondary battery is provided. The battery comprises a positive electrode includes a lithium-nickel complex oxide, a negative electrode includes a lithium-titanium complex oxide and a lithium-containing phosphorous oxide, and a nonaqueous electrolyte.

5 Claims, 6 Drawing Sheets

NONAQUEOUS ELECTROLYTE SECONDARY BATTERY HAVING A NEGATIVE ELECTRODE COMPRISING A LITHIUM-CONTAINING PHOSPHOROUS OXIDE, A BATTERY PACK AND VEHICLE CONTAINING THE BATTERY

CROSS-REFERENCE TO RELATED APPLICATIONS

This application is a Continuation Application of PCT Application No. PCT/JP2010/051518, filed Feb. 3, 2010 and based upon and claiming the benefit of priority from prior Japanese Patent Application No. 2009-022663, filed Feb. 3, 2009, the entire contents of all of which are incorporated herein by reference.

FIELD

Embodiments described herein relate generally to a nonaqueous electrolyte battery, a battery pack and a vehicle provided with the battery.

BACKGROUND

A nonaqueous electrolyte secondary battery has been developed for use as a high-energy density battery. Such a nonaqueous electrolyte secondary battery is charged/discharged by the migration of lithium ions between the negative electrode and the positive electrode. The nonaqueous electrolyte secondary battery is expected to be utilized also as middle or large power sources besides power sources for miniature electronic devices and is therefore desired to have a higher energy density.

A nonaqueous electrolyte secondary battery comprises a lithium transition metal complex oxide as the positive electrode active material and a carbon material as the negative electrode active material. JP-A 2001-23629(KOKAI) discloses, for example, a nonaqueous electrolyte secondary battery using a lithium-nickel complex oxide having a high energy density as the positive electrode active material. However, this lithium-nickel complex oxide is less thermally stable and there is a problem of lower battery safety.

On the other hand, KOSUGI Shinichiro, and two others, "Toshiba Review", 2008, vol. 63, No. 2, pp. 54-57, discloses a nonaqueous electrolyte secondary battery using a lithium-titanium complex oxide as the negative electrode active material. The reference discloses that such a battery is resistant to thermorunaway even if internal short circuits are developed by, for example, external force and is therefore improved in safety.

DETAILED DESCRIPTION

In general, according to one embodiment, a nonaqueous electrolyte secondary battery which is highly safe and has a high energy density, and a battery pack and a vehicle each provided with the battery are provided.

According to one embodiment, a nonaqueous electrolyte secondary battery is provided. The battery comprises a positive electrode comprising a lithium-nickel complex oxide, a negative electrode comprising a lithium-titanium complex oxide and a lithium-containing phosphorous oxide, and a nonaqueous electrolyte. The battery satisfy the following equations (1) to (5):

$$b/a < y/x \quad (1)$$

$$75 \leq b/a \leq 90 \quad (2)$$

$$90 \leq y/x \leq 100 \quad (3)$$

$$x < z \quad (4)$$

$$0 < \gamma/\beta \leq (ay-bx)/bz \quad (5)$$

where;

a is a lithium-deintercalation capacity [mAh/g] of the lithium-nickel complex oxide in the first charge;

b is a lithium-intercalation capacity [mAh/g] of the lithium-nickel complex oxide in the first discharge;

x is a lithium-intercalation capacity [mAh/g] of the lithium-titanium complex oxide in the first charge;

y is a lithium-deintercalation capacity [mAh/g] of the lithium-titanium complex oxide in the first discharge;

z is a lithium-intercalation capacity [mAh/g] of the lithium-containing phosphorous oxide;

β is a mass [g] of the lithium-titanium complex oxide; and

γ is a mass [g] of the lithium-containing phosphorous oxide.

Generally, when the temperature of a nonaqueous electrolyte secondary battery is raised by some external factor, this causes exothermic reaction between the negative electrode and the electrolytic solution. Thereby, the temperature of the battery further rise which result in that the temperature of the battery reaches the thermorunaway temperature of the battery, causing the thermorunaway of the battery. If a material having high thermal stability is used as the negative electrode active material, this prevents the exothermic reaction between the negative electrode and the electrolytic solution, with the result that the thermorunaway of the positive electrode is prevented. Therefore, it is expected that the stability of the battery is improved.

Accordingly, it is predicted that a nonaqueous electrolyte secondary battery which has high safety while maintaining a high energy density is obtained by using a lithium-nickel complex oxide having a high energy density as the positive electrode active material and a lithium-titanium complex oxide having high safety as the negative electrode active material.

However, the lithium ion-intercalation (i.e. absorption)/deintercalation (i.e. release) efficiency of the lithium-nickel complex oxide in a first cycle charge/discharge is lower than that of a lithium-titanium complex oxide. Therefore, a nonaqueous electrolyte secondary battery using a lithium-nickel complex oxide as the positive electrode active material and a lithium-titanium complex oxide as the negative electrode active material cannot reflect the high energy density of the lithium-nickel complex oxide on the energy density of a battery.

(First Embodiment)

A nonaqueous electrolyte secondary battery according to a first embodiment comprises an electrode group, a nonaqueous electrolyte, and a container. The electrode group and the nonaqueous electrolyte are accommodated in a container. At least a part of the nonaqueous electrolyte is contained in the electrode group. The electrode group comprises a negative electrode, positive electrode and separator interposed between the positive and negative electrodes. The positive electrode comprises a lithium-nickel complex oxide. The negative electrode comprises an active material comprising a lithium-titanium complex oxide and a lithium-containing phosphorous oxide.

A general lithium ion secondary battery using graphite as the negative electrode active material and $LiCoO_2$ as the positive electrode active material has an energy density of 360 Wh/kg. A lithium ion secondary battery using graphite as the negative electrode active material and $LiNiO_2$ as the positive electrode active material, in turn, has an energy density of 444 Wh/kg. As mentioned above, the battery using $LiNiO_2$ as the positive electrode active material has an energy density about 1.2 times higher than that of a battery using $LiCoO_2$ as the positive electrode active material. However, it is known that $LiNiO_2$ is a material having lower thermal stability than $LiCoO_2$ and the use of $LiNiO_2$ arouses a fear as to low safety of a battery.

Since the exothermic reaction between the negative electrode and electrolytic solution is the trigger to the thermorunaway of a nonaqueous electrolyte secondary battery, as mentioned above, it is expected that the stability of a battery is improved by using a material having high thermal stability as the negative electrode active material.

Here, examples of a material used for the negative electrode having higher thermal stability than graphite include lithium titanate $Li_{4+x}Ti_5O_{12}$ (x is varied in the following range: $-1 \leq x \leq 3$ by a charge/discharge reaction) having a spinel structure. A nonaqueous electrolyte secondary battery improved in safety can be obtained by combining a negative electrode using a lithium-titanium complex oxide with a positive electrode using a lithium-nickel complex oxide.

In the meantime, the ratio of the lithium-intercalation capacity in the first discharge to lithium-deintercalation capacity in the first charge of the lithium-nickel complex oxide (for example, $LiNiO_2$) (namely, lithium-intercalation/deintercalation efficiency in the first cycle charge/discharge) is about 85%. On the other hand, the ratio of the lithium-deintercalation capacity in the first discharge to lithium-intercalation capacity in the first charge of the lithium-titanium complex oxide (for example, $Li_{4+x}Ti_5O_{12}$) (lithium-intercalation/deintercalation efficiency in the first cycle charge/discharge) is about 95%. Accordingly, among lithium ions deintercalated from the lithium-titanium complex oxide in the negative electrode, excess lithium ions remain unabsorbed by the lithium-nickel complex oxide in the positive electrode.

In the battery according to the embodiment, a part of the lithium-titanium complex oxide corresponding to that which deintercalates excess lithium ions is substituted by a lithium-containing phosphorous oxide. The lithium-containing phosphorous oxide has a higher lithium-absorbing capacity (absorbing capacity per mass) in the first charge-discharge cycle than that of the lithium-titanium complex oxide. So that such a battery can be reduced in the mass of the negative electrode to thereby increase the energy density of the battery.

The negative electrode in which a part of the lithium-titanium complex oxide is substituted by the lithium-containing phosphorous oxide is reduced in lithium-deintercalation capacity and is therefore reduced in lithium-intercalation/deintercalation efficiency. When the intercalation/deintercalation efficiency of the negative electrode becomes lower than that of the positive electrode, the energy efficiency of the battery is reduced. So that the lithium-containing phosphorous oxide is added to the extent that the first cycle intercalation/deintercalation efficiency of the negative electrode is not lower than that of the positive electrode. Specifically, the amount of the lithium-containing phosphorous oxide contained in the negative electrode is in the range satisfying the following equations (1) to (5).

$$b/a < y/x \tag{1}$$

$$75 \leq b/a \leq 90 \tag{2}$$

$$90 \leq y/x \leq 100 \tag{3}$$

$$x < z \tag{4}$$

$$0 < \gamma/\beta \leq (ay - bx)/bz \tag{5}$$

where;

a is a lithium-deintercalation capacity [mAh/g] of the lithium-nickel complex oxide in the first charge;

b is a lithium-intercalation capacity [mAh/g] of the lithium-nickel complex oxide in the first cycle discharge;

x is a lithium-intercalation capacity [mAh/g] of the lithium-titanium complex oxide in the first charge;

y is a lithium-deintercalation capacity [mAh/g] of the lithium-titanium complex oxide in the first discharge;

z is a lithium-intercalation capacity [mAh/g] of the lithium-containing phosphorous oxide;

β is a mass [g] of the lithium-titanium complex oxide; and

γ is a mass [g] of the lithium-containing phosphorous oxide.

The above equation (1), shows that the intercalation/deintercalation efficiency of the lithium-nickel complex oxide is lower than that of the lithium-titanium complex oxide. The above equation (2) shows the range of the intercalation/deintercalation efficiency of the lithium-nickel complex oxide. The above equation (3) shows the range of the intercalation/deintercalation efficiency of the lithium-titanium complex oxide. The above equation (4) shows that the lithium-intercalation capacity of the lithium-containing phosphorous oxide is larger than that of the lithium-titanium complex oxide.

Here, methods of measuring a, b, x, y, and z will be explained.

A three-electrode-type cell is produced using an electrode essentially consisting of the above lithium-nickel complex oxide, a conductive agent and a binder as the working electrode, and a lithium metal as the counter electrode, and the reference electrode. This three-electrode-type cell which has been yet uncharged and undischarged is subjected to constant-current charge under a current of 0.1 C or less until the potential of the working electrode of the cell reaches 4.25 V with respect to a lithium metal. Here, 1 C means the current value required for discharging the rated capacity of the cell in one hour. After the potential of the working electrode reaches 4.25 V, the cell is made to charge at a constant voltage of 4.25 V for 10 hours to determine the lithium-deintercalation capacity at this time as a (first charge). The three-electrodetype cell put in charged state is made to discharge under a constant current of 0.1 C or less until the potential of the working electrode reaches 3.0 V with respect to a metal lithium to determine the lithium-intercalation capacity at this time as b (first discharge).

A three-electrode-type cell is produced using an electrode essentially consisting of the above lithium-titanium complex oxide, a conductive agent and a binder as the working electrode, and a lithium metal as the counter electrode and the reference electrode. This three-electrode-type cell which has been yet uncharged and undischarged is subjected to constant-current charge under a current of 0.1 C or less until the potential of the working electrode of the cell reaches 1.4 V with respect to a lithium metal. After the potential of the working electrode reaches 1.4 V, the cell is made to charge at a constant voltage of 1.4 V for 10 hours to determine the lithium-intercalation capacity at this time as x (first charge). The three-electrode-type cell put in charged state is made to discharge under a constant current of 0.1 C or less until the potential of the working electrode reaches 2-0 V with respect to a metal lithium to determine the lithium-deintercalation capacity at this time as y (first discharge).

A three-electrode-type cell is produced using an electrode essentially consisting of the above lithium-containing phosphorous oxide, a conductive agent and a binder as the working electrode, and a lithium metal as the counter electrode and the reference electrode. This three-electrode-type cell is subjected to constant-current charge under a current of 0.1 C or less until the potential of the working electrode reaches 4.25 V with respect to a lithium metal. After the potential of the working electrode reaches 4.25 V, the cell is made to charge at a constant voltage of 4.25 V for 10 hours to deintercalation lithium. The three-electrode-type cell is made to discharge under a constant current of 0.1 C or less until the potential of the working electrode reaches 1.4 V with respect to a metal lithium. After the potential of the working electrode reaches 1.4 V, the cell is made to charge at a constant voltage of 1.4 V for 10 hours to determine the lithium-intercalation capacity as z. Or, a three-electrode-type cell is produced using an electrode essentially consisting of a phosphorous oxide containing no lithium, a conductive agent and a binder as the working electrode, and a lithium metal as the counter electrode and the reference electrode. This three-electrode-type cell is subjected to constant-current discharge under a current of 0.1 C or less until the potential of the working electrode reaches 1.4 V with respect to a lithium metal. After the potential of the working electrode reaches 1.4 V, the cell is made to charge at a constant voltage of 1.4 V for 10 hours to determine the lithium-intercalation capacity as z.

The value of 1 C in the charge/discharge current can be calculated from the mass of the active material and the theoretical value per mass of the active material.

The above equation (5) shows that the ratio $\gamma/\beta$ by mass of the lithium-containing phosphorous oxide to the lithium-titanium complex oxide is lower than (ay−bx)/bz. The energy density of the nonaqueous electrolyte battery reaches its maximum when the positive electrode and negative electrode are equal in charge/discharge efficiency and in first charge capacity. This is just the case where the following equations are established when the mass of the lithium-nickel complex oxide contained in the positive electrode is $\alpha$[g]:

$$\alpha b = \beta y \qquad \text{Equation (A)}$$

$$\beta x + \gamma z = \alpha a \qquad \text{Equation (B)}$$

At this time, the value of $\gamma/\beta$ is (ay−bx)/bz.

The lithium-containing phosphorous oxide has a higher lithium-intercalation capacity than that of the lithium-titanium complex oxide in the first charge/discharge and also has such a nature that it does not almost deintercalation lithium though it absorbs lithium at a potential at which the lithium-titanium complex oxide undergoes a lithium-intercalation/deintercalation reaction.

The lithium-intercalation capacity of the lithium-containing phosphorous oxide is larger than that of the lithium-titanium oxide as mentioned above. Therefore, the mass of the negative electrode can be reduced without any variation in the lithium-intercalation capacity by substituting a part of the lithium-titanium complex oxide with the lithium-containing phosphorous oxide, with the result that the energy density of the battery can be increased.

Furthermore, the lithium-containing phosphorous oxide is known to be a material having high thermal stability and does not therefore decrease the safety of the lithium-titanium complex oxide in the negative electrode. As mentioned above, the thermorunaway of the negative electrode is a trigger of the abnormal exothermic phenomenon of a lithium ion secondary battery. Therefore, even if the lithium-titanium complex oxide is used for the negative electrode, high safety cannot be maintained unless additives used to increase energy density are thermally stable. Accordingly, a structure comprising the lithium-nickel complex oxide as the positive electrode and the lithium-titanium complex oxide and lithium-containing phosphorous oxide as the negative electrode makes it possible to provide a nonaqueous electrolyte secondary battery having both high-density energy and safety.

Although the first cycle intercalation/deintercalation efficiency of the negative electrode is reduced by substituting a part of the lithium-titanium complex oxide with the lithium-containing phosphorous oxide as mentioned above, the energy density of the battery is improved because the mass of the negative electrode is reduced. Then, the largest energy density is obtained when the efficiency of the positive electrode is equal to that of the negative electrode, that is, when $\gamma/\beta = (ay-bx)/bz$.

When, for example, a lithium-nickel complex oxide $LiNi_{0.8}CO_{0.15}Al_{0.05}O_2$ having a lithium-deintercalation capacity of about 211 mAh/g (deintercalates until the potential is increased to 4.25 V vs Li/Li$^+$) and a lithium-intercalation capacity of about 178 mAh/g (absorbs until the potential is reduced to 3.00 V vs Li/Li$^+$) in the first cycle charge/discharge is used as the positive electrode active material and a lithium-titanium complex oxide $Li_4Ti_5O_{12}$ having a lithium-intercalation capacity of about 160 mAh/g (absorbs until the potential is reduced to 1.45 V vs Li/Li$^+$) and a lithium-deintercalation capacity of about 152 mAh/g (deintercalates until the potential is increased to 2.00 V vs Li/Li$^+$) in the first cycle charge/discharge is used as the negative electrode active material, for example, 13.19 g of the negative electrode active material is required for 10 g of the positive electrode active material. In the battery having such a structure, the energy density of the battery is about 173.5 Wh/kg ($\cong$(178 [mAh/g]×10 [g]×2.26[V])/(10 [g]+13.19 [g])) because the average working potential of the battery having such a structure is 2.26 V. Here, the mass is only that of the active material.

Here, a part of $Li_4Ti_5O_{12}$ is substituted with the lithium-containing phosphorous oxide $LiFePO_4$ having an intercalation capacity of about 189 mAh/g when it absorbs lithium until the potential is reduced to the intercalation potential (=1.45 V vs Li/Li$^+$) of $Li_4Ti_5O_{12}$. The amount of $LiFePO_4$ to be added is just a level at which the intercalation/deintercalation efficiency of the negative electrode is equal to that of the positive electrode and is 10.6 mass % based on the mass of $Li_4Ti_5O_{12}$. Then, for example, the amount of the negative electrode active material required for 10 g of the positive electrode active material is 12.96 g, leading to reduction in the mass of the negative electrode active material. Therefore, the energy density of the battery is 175.2 Wh/kg, showing that it is increased by about 1% than that obtained when using no $LiFePO_4$.

Although the increase in energy density is of the order of about 1%, the capacity of the battery is surely increased, bringing about a large difference with increase in the size of the battery. Further, because the battery comprises many auxiliary members other than the active materials, it is very important to increase the energy density of only the active materials.

Figure 1:
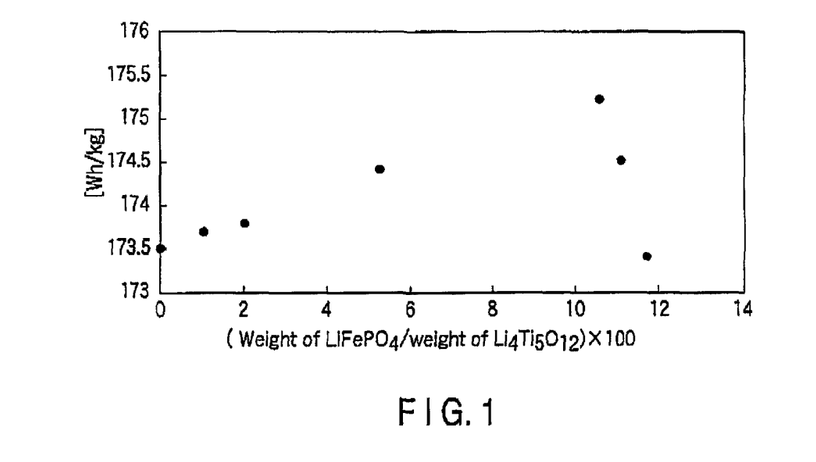
FIG. 1 is a graph illustrating the relation between the amount of LiFePO$_4$ and energy density in a battery according to a first embodiment.

FIG. 1 is a graph showing the relation between energy density and the ratio by mass of $LiFePO_4$ in the above-exemplified nonaqueous electrolyte secondary battery using $LiNi_{0.8}Co_{0.15}Al_{0.05}O_2$ as the positive electrode active material and $Li_4Ti_5O_{12}$ and $LiFePO_4$ as the negative electrode active material. The mass ratio is expressed by the ratio of the mass of $LiFePO_4$ contained in the negative electrode active material to the mass of $Li_4Ti_5O_{12}$ contained in the negative electrode active material. As shown in FIG. 1, the nonaqueous electrolyte secondary battery having the aforementioned structure is improved in energy density when the ratio by mass of the lithium-containing phosphorous oxide is about 11.5 or less.

As mentioned above, the largest energy density is obtained when the lithium-intercalation/deintercalation efficiency of the positive electrode in the first cycle charge/discharge is equal to that of the negative electrode in the case of taking the active material into account. However, there is the case where the positive electrode differs from the negative electrode in the amounts of the conductive agent and binder other than the active material, area and lithium-intercalation/deintercalation capacity. In such a case, it is necessary to determine the balance between the first cycle lithium-intercalation/deintercalation capacities of both electrodes in accordance with the design of the battery. In this case, it is only required to properly adjust the ratio by mass of the lithium-containing phosphorous oxide.

In the meantime, the lithium-containing phosphorous oxide has low conductivity. For this, the lithium-containing phosphorous oxide is preferably made to support carbon. A satisfactory lithium-intercalation capacity can be obtained when carbon is carried on the lithium-containing phosphorous oxide. Because the lithium-containing phosphorous oxide with carbon carried thereon functions as the conductive agent of the negative electrode layer, the amount of carbon to be added as a conductive agent to the negative electrode can be reduced. Moreover, the carbon carried on the lithium-containing phosphorous oxide is more increased in contact area than the carbon to be added as the conductive agent to the electrode. For this, the carbon to be carried can produce the same effect even if the amount of the carbon is smaller than that of carbon used as the conductive agent. Accordingly, the total amount of the conductive agent (i.e. carbon) contained in the negative electrode can be reduced, and therefore, the energy density of the battery can be increased.

Hereinafter, the positive electrode, negative electrode, nonaqueous electrolyte, separator and container will be explained in detail.

1) Positive Electrode

The positive electrode comprises a current collector and a positive electrode layer (i.e. a positive electrode active material-containing layer). The positive electrode layer is formed on one or both of surfaces of the current collector and comprises an active material and according to the need, a conductive agent and a binder.

The positive electrode active material comprises a lithium-nickel complex oxide. For example, lithium-nickel complex oxides represented by $Li_aNiO_2$ or $Li_aNi_{1-e-f}Co_eM_fO_2$ (here, M is at least an element selected from Al, Cr, and Fe, $0 \leq e \leq 0.5$, $0 \leq f \leq 0.1$) may be used, though the embodiment is not limited to these compounds. As mentioned above, every lithium-nickel complex oxide has a lower first cycle intercalation/deintercalation efficiency than the lithium-titanium complex oxide to be used for the negative electrode. Therefore, among lithium deintercalated from the lithium-titanium complex oxide in the negative electrode, excess lithium ions which are not absorbed by the lithium-nickel complex oxide in the positive electrode are generated. In the embodiment, a part of lithium-titanium complex oxide which deintercalates excess lithium ions like this is substituted with a lithium-containing phosphorous oxide having a higher lithium-intercalation capacity in the first charge-discharge to thereby enable a reduction in the mass of the negative electrode and hence an increase in the energy density of the battery. Therefore, no particular limitation is imposed on the lithium-nickel complex oxide and the effect of the embodiment can be obtained even if any lithium-nickel complex oxide is used as the positive electrode active material. Particularly, a lithium-nickel complex oxide represented by $Li_aNi_{i-e-f}Co_eAl_fO_2$ is preferably used as the positive electrode active material.

As the positive electrode active material, the lithium-nickel complex oxide may be singly used or other active materials may be contained. When other active materials are contained, 80% or more of the mass of all active material is preferably the lithium-nickel complex oxide. When the content of the lithium-nickel complex oxide is less than 80% by mass, the effect of increasing the energy density of the battery according to the embodiment is obtained insufficiently. The content of the lithium-nickel complex oxide is more preferably 90 to 100% by mass.

For example, oxides or polymers may be used as the other positive electrode active material.

As the oxides, manganese dioxide ($MnO_2$), iron oxide, copper oxide, nickel oxide, $Li_aMnO_2$, lithium-cobalt complex oxides ($Li_aCoO_2$), lithium-manganese-cobalt complex oxides, for example, $LiMn_{1-g-h}Co_gM_hO_2$ (here, M is at least one or more elements selected from Al, Cr, Mg and Fe, $0 \leq g$—0.5, $0 \leq h \leq 0.1$), lithium-manganese-nickel complex oxides, for example, $LiMn_jNi_jM_{i-2j}O_2$ (here, M is at least one or more elements selected from Co, Cr, Al, Mg and Fe, $\frac{1}{3} \leq j \leq \frac{1}{2}$, for example, $LiMn_{1/3}Ni_{1/3}Co_{1/3}O_2$ and $LiMn_{1/2}Ni_{1/2}O_2$), lithium-manganese complex oxides having a spinel structure, for example, $Li_aMn_{2-b}M_bO_4$ (here, M is at least one or more elements selected from Al, Cr, Ni, and Fe), lithium-manganese-nickel complex oxides having a spinel structure (for example, $Li_aMn_{2-b}Ni_bO_4$), lithium-containing phosphorous oxide having an olivine structure (for example, $Li_aFePO_4$, $Li_aFe_{1-b}Mn_bPO_4$, and $Li_aCoPO_4$) or vanadium oxide (for example, $V_2O_5$) may be used. Here, each of a, b, and c is preferably 0 to 1, respectively.

As the polymer, conductive high-molecular materials such as a polyaniline and polypyrrole and disulfide-type polymer materials may be used. Besides the above materials, sulfur (S), fluorocarbon, iron sulfate ($Fe_2(SO_4)_2$) and the like may be used as other positive electrode active material.

More preferably, a lithium-cobalt complex oxide, lithium-manganese-nickel complex oxide, lithium-manganese complex oxide having a spinel structure, lithium-manganese-nickel complex oxide having a spine structure, lithiummanganese-cobalt complex oxide or lithium iron phosphate may be used as other positive electrode active material. The current collector is preferably made of, for example, an aluminum foil or aluminum alloy foil containing at least one element selected from Mg, Ti, Zn, Mn, Fe, Cu and Si.

The aluminum foil or aluminum alloy foil preferably has an average crystal grain diameter of, preferably, 50 µm or less, more preferably 30 µm or less and even more preferably 5 µm or less. When the average crystal grain diameter is less than 50 µm, the strength of the aluminum foil or aluminum alloy foil is outstandingly improved. Therefore, the positive electrode active material-containing layer is highly densified by raising pressing pressure to thereby increase positive electrode capacity.

The average crystal grain diameter may be found in the following method. First, the surface texture of the current collector is observed by an optical microscope to find the number (n) of crystal grains existing in an area of 1 mm×1 mm. Using this n, the average crystal grain area S is calculated from $S=1\times10^6/n$ (µm$^2$). An average crystal grain diameter d (µm) is calculated by the following equation (6).

$$d=2(S/n)^{1/2} \quad (6)$$

The average crystal grain diameter of the aluminum foil or aluminum alloy foil is varied by complicated influences given from a plurality of factors such as a material textile, impurities, processing conditions, history of heat treatment, and annealing conditions. The crystal grain diameter can be controlled by combining the above various factors in the course of the production of the current collector.

The thickness of the aluminum foil or aluminum alloy foil is preferably 20 µm or less and more preferably 1.50 µm or less. The aluminum foil preferably has a purity of 99% by mass or more. The aluminum alloy is preferably an alloy containing elements such as magnesium, zinc and silicon. Transition metals such as iron, copper, nickel and chromium contained as the alloy components are preferably contained in an amount of 1% by mass or less. The surface of the aluminum foil or aluminum alloy foil is preferably roughened to improve adhesion to the positive electrode layer.

As the conductive agent, carbonaceous materials such as acetylene black, carbon black, and graphite may be used. This conductive agent can improve current-collecting performance and limit contact resistance with the current collector.

A polytetrafluoroethylene (PTFE), polyvinylidene fluoride (PVdF) or fluoro-rubber may be used as the binder. The binder serves to bind the positive electrode layer with the current collector.

The positive electrode active material, conductive agent and binder are preferably formulated in ratios of 73% by mass to 95% by mass, 3% by mass to 20% by mass and 2% by mass to 7% by mass respectively. The conductive agent can produce the aforementioned effect by blending it in an amount of 3% by mass or more. The decomposition of the nonaqueous electrolyte on the surface of the conductive agent can be reduced by blending it in an amount of 20% by mass or less when the nonaqueous electrolyte is stored at high temperatures. When the binder is formulated in an amount of 2% by mass or more, sufficient electrode strength can be obtained. When the binder is formulated in an amount of 7% by mass or less, the amount of the binder to be formulated as an insulating material in the electrode can be reduced, making possible to reduce internal resistance.

The positive electrode can be manufactured by suspending, the positive electrode active material, conductive agent and binder in a proper solvent to prepare a slurry, by applying this slurry to the surface of the positive electrode current collector and by drying the slurry, to produce a positive electrode layer, followed by pressing. The positive electrode may also be manufactured by forming a pellet essentially consisting of the positive electrode active material, conductive agent and binder to produce a positive electrode layer, which is formed on the current collector.

2) Negative Electrode

The negative electrode comprises a current collector and a negative electrode layer (i.e. a negative electrode active material-containing layer). The negative electrode layer is formed on one or both of surfaces of the current collector and comprises an active material, a conductive agent and a binder.

The negative electrode active material comprises a lithium-titanium oxide and a lithium-containing phosphorous oxide.

As the lithium-titanium complex oxide, for example, lithium titanate represented by the formula $Li_{4+x}Ti_5O_{12}$ ($-1 \leq x \leq 3$) and having a spinel structure and $Li_{2+x}Ti_3O_7$ ($-1 \leq x \leq 3$) having a rhamsdelite structure may be used.

Further, as the lithium-titanium complex oxide, a metal complex oxide containing Ti and at least one element selected from P, V, Sn, Cu, Ni and Fe may be used. As such metal complex oxide, for example, $TiO_2$—$P_2O_5$, $TiO_2$—$V_2O_5$, $TiO_2$—$P_2O_5$—$SnO_2$, or $TiO_2$—$P_2O_5$-MeO (here, Me is at least one element selected from Cu, Ni and Fe) may be used. This metal complex oxide preferably has less crystallinity and a micro-structure in which a crystal phase and an amorphous phase coexist or an amorphous phase singly exists. Such a metal complex oxide having a micro-structure can improve cycle performance remarkably. These metal complex oxides become lithium-titanium complex oxides when lithium is introduced by charging. Particularly, lithium titanate having a spinel structure has excellent cycle performance and therefore it is used preferably.

As the lithium-containing phosphorous oxide, $Li_sFePO_4$ ($0<s\leq1.15$), $Li_sFe_{1-t}Mn_tPO_4$ ($0<s\leq1.15$, $0\leq t\leq1$), or $Li_sCoPO_4$ ($0<s\leq1.15$) may be used. Among these compounds, $Li_sFePO_4$ is superior in electroconductivity and therefore it is used preferably.

The content of the lithium-containing phosphorous oxide is so designed that the ratio $\gamma/\beta$ by mass of the lithium-containing phosphorous oxide to the lithium-titanium complex oxide in the active material contained in the negative electrode is (ay−bx)/bz or less.

The lithium-containing phosphorous oxide is preferably made to support carbon to thereby exhibit conductivity by using a method in which carbon is combined with the burned lithium-containing phosphorous oxide by mechanical milling or a method in which the lithium-containing phosphorous oxide and a carbon source are burned together.

As the negative electrode active material, only the lithium-titanium complex oxide and lithium-containing phosphorous oxide may be contained or other active materials may be contained. When these other active materials are contained, the total amount of the lithium-titanium complex oxide and lithium-containing phosphorous oxide is preferably 80% by mass or more based on the weight of all active materials. When the total content of the lithium-titanium complex oxide and lithium-containing phosphorous oxide is less than 80% by mass, there is a fear as to low safety. The total content of the lithium-titanium complex oxide and lithium-containing phosphorous oxide is more preferably in a range from 90 to 100% by mass.

For example, carbonaceous materials or metal compounds may be used as the other negative electrode active materials.

As the carbonaceous material, for example, natural graphite, artificial graphite, cokes, vapor-grown carbon fibers, meso-phase pitch carbon fibers, spherical carbon or burned resin carbon may be used. Particularly, vapor-grown carbon fibers, meso-phase pitch carbon fibers, and spherical carbon are preferably used. The spacing (d=002) of the (002) plane of the carbonaceous material measured by X-ray diffraction is preferably 0.340 nm or less.

As the metal compound, a metal sulfide or metal nitride may be used. Titanium sulfide such as $TiS_2$, molybdenum sulfide such as $MoS_2$ and iron sulfide such as $FeS$, $FeS_2$ and $Li_xFeS_2$ may be used as the metal sulfide. Lithium-cobalt nitrides (for example, $Li_sCo_tN$ wherein $0<s<4$, $0<t<0.5$) may be used as the metal nitride.

As the negative electrode current collector, for example, an aluminum foil or an aluminum alloy foil containing elements such as Mg, Ti, Zn, Mn, Fe, Cu, and Si is used preferably.

The aluminum foil or aluminum alloy foil constituting the current collector preferably has an average crystal grain diameter of, preferably, 50 µm or less, more preferably 30 µm or less and even more preferably 5 µm or less. When the average crystal grain diameter is 50 µm or less, the strength of the aluminum foil or aluminum alloy foil is outstandingly improved. For this, pressing pressure can be raised to highly density the negative electrode active material-containing layer, thereby increasing the capacity of the negative electrode. Further, dissolution and corrosive deterioration of the current collector in over-discharge state under a high-temperature environment (40° C. or more) can be prevented. For this, a rise in negative electrode impedance can be limited. Moreover, output performance, rapid charging performance and charge/discharge cycle performance can also be improved.

The average crystal grain diameter can be found by the above method. The average crystal grain diameter of the aluminum foil or aluminum alloy foil is varied by complicated influences from a plurality of factors such as a material structure, impurities, processing conditions, the history of heat treatment and annealing conditions. The crystal grain diameter can be controlled by combining the above various factors in the course of producing the current collector.

The thickness of the aluminum foil or aluminum alloy foil is preferably 20 µm or less and more preferably 1.50 µm or less. The aluminum foil preferably has a purity of 99% by mass or more. The aluminum alloy is preferably an alloy containing elements such as magnesium, zinc, and silicon. The content of transition metals such as iron, copper, nickel and chromium which are contained as alloy components is preferably 1% by mass or less. The surface of the aluminum foil or aluminum alloy foil is preferably roughened to improve adhesion to the negative electrode layer.

As the conductive agent, carbonaceous materials such as acetylene black, carbon black, and graphite may be used. This conductive agent can improve current-collecting performance and limit contact resistance with the current collector.

As the binder, for example, a polytetrafluoroethylene (PTFE), polyvinylidene fluoride (PVdF), fluoro-rubber, or styrene-butadiene rubber may be used. The binder is used to bind the positive electrode layer with the current collector.

The negative electrode active material, conductive agent and binder are preferably formulated in ratios of 73% by mass to 96% by mass, 2% by mass to 20% by mass and 2% by mass to 7% by mass respectively. When the amount of the conductive agent is less than 2% by mass, there is a fear that the current collecting performance of the negative electrode layer is lowered and the large-current performance of the battery is deteriorated. The decomposition of the nonaqueous electrolyte on the surface of the conductive agent can be reduced by blending it in an amount of 20% by mass or less when the nonaqueous electrolyte is stored at high temperatures. When the binder is formulated in an amount less than 2% by mass, there is a fear that the binding ability of the negative electrode layer with the negative electrode current collector is deteriorated, leading to deteriorated cycle performance. When the amount of the binder to be formulated is 7% by mass or less, the amount of an insulating material to be formulated in the electrode can be reduced, making possible to reduce internal resistance.

The negative electrode can be manufactured by adding the conductive agent and binder to the powdery negative electrode active material, suspending these materials in a proper solvent to prepare a slurry, by applying this slurry to the surface of the negative electrode current collector and by drying the slurry, to produce a negative electrode layer, followed by pressing. The lithium-containing phosphorous oxide contained in the negative electrode active material is used in the state that it has been deintercalated lithium by electrochemical measures. The lithium-containing phosphorous oxide put in the lithium-deintercalated state is returned to the lithium-absorbed state in the battery after the battery is manufactured. The negative electrode may also be manufactured by forming a pellet essentially consisting of the negative electrode active material, conductive agent and binder to produce a negative electrode layer, which is formed on the current collector.

3) Nonaqueous Electrolyte

As the nonaqueous electrolyte, a liquid nonaqueous electrolyte prepared by dissolving an electrolyte in a nonaqueous solvent (nonaqueous electrolytic solution), a polymer gel-like electrolyte prepared by formulating the above nonaqueous solvent and electrolyte in a high-molecular material, a high-molecular solid electrolyte prepared by formulating the above electrolyte in a high-molecular material, or an inorganic solid electrolyte having lithium ion-conductivity may be used.

As the electrolyte, alkali salts are preferable and lithium salts are especially preferable. As the lithium salts, $LiPF_6$, $LiBF_4$, $Li(CF_3SO_2)_2N$ (bistrifluoromethanesulfonylamide lithium; commonly called LiTFSI), $LiCF_3SO_3$ (commonly called LiTFS), $Li(C_2F_5SO_2)_2N$ (bispentafluoroethanesulfonylamide lithium; commonly called LiBETI), $LiClO_4$, $LiAsF_6$, $LiSbF_6$, $LiB(C_2O_4)_2$ (lithium bisoxalatoborate; commonly called LiBOB), or lithium difluoro(trifluoro-2-oxide-2-trifluoro-methylpropionato(2-)-0,0)borate ($LiBF_2(OCOOC(CF_3)_2)$) (commonly called $LiBF_2$(HHIB))) may be used. Especially, $LiPF_6$ or $LiBF_4$ is preferable. These electrolyte salts may be used either singly or in combinations of two or more. The concentration of the electrolyte dissolved in a nonaqueous solvent is preferably 0.5 to 2 mol/L. When the concentration falls in this range, the performance of the battery when a high-load current is flowed can be more improved while limiting the influence of increase in viscosity caused by a rise in the concentration of the electrolyte.

As the nonaqueous solvent to be used in the liquid nonaqueous electrolyte, nonaqueous solvents known for lithium secondary batteries may be used. For example, propylene carbonate (PC), ethylene carbonate (EC), 1,2-dimethoxyethane (DME), γ-butyrolactone (GBL), tetrahydrofuran (THF), 2-methyltetrahydrofuran (2MeHF), 1,3-dioxolan, sulfolan, acetonitrile (AN), diethyl carbonate (DEC), dimethyl carbonate (DMC), methylethyl carbonate (MEC) and dipropyl carbonate may be used. However, the embodiment is not limited to these compounds. These solvents may be used either independently or in combinations of two or more.

The effect of the embodiment is increased with increase in the difference in first cycle lithium-intercalation/deintercalation efficiency between the negative and positive electrodes.

Then, when propylene carbonate is used as the nonaqueous solvent, the first cycle lithium-intercalation/deintercalation efficiency of the positive electrode tends to be lower. Accordingly, when propylene carbonate is used as the nonaqueous solvent, the remarkable effect is obtained.

The gel-like electrolyte is obtained by dissolving the aforementioned nonaqueous solvent and electrolyte in a high-molecular material. As the high-molecular material, polymers of monomers such as a polyacrylonitrile, polyacrylate, polyvinylidene fluoride (PVdF), and polyethylene oxide (PEO) or copolymers of these monomers and other monomers may be used.

Solid electrolytes are those obtained by dissolving the above electrolytes in high-molecular materials and by solidifying the obtained solution. As the high-molecular material, polymers of monomers such as a polyacrylonitrile (PAN), polyvinylidene fluoride (PVdF), and polyethylene oxide (PEO) or copolymers of these monomers and other monomers may be used. Further, examples of inorganic solid electrolytes include ceramic materials containing lithium. Specific examples of the inorganic solid electrolyte include $Li_3N$ and $Li_3PO_4$—$Li_2S$—$SiS_2$ glass.

Additives may be added to the nonaqueous electrolyte. As the additives, for example, vinylene carbonate (VC), vinylene acetate (VA), vinylene butylate, vinylene hexanoate, vinylene crotonate, and catechol carbonate may be used, without no limitation. The amount of the additives to be added is 0.1 to 3% by mass and more preferably 0.5 to 1% by mass in terms of external ratio.

4) Separator

A separator may be disposed between the positive electrode and the negative electrode. A gel-like or solid nonaqueous electrolyte layer may be used together with or in place of this separator.

The separator serves to prevent the positive electrode from being in contact with the negative electrode and is constituted of an insulating material. The separator has a shape allowing the electrolyte to move between the positive electrode and negative electrode. As the separator, porous films formed of a polyethylene, polypropylene, cellulose or polyvinylidene fluoride (PVdF), or nonwoven fabrics formed of synthetic resin are preferably used. Among these materials, porous films formed of a polyethylene or polypropylene can melt at a fixed temperature to cut off current and are therefore preferable in view of improving safety.

5) Container

A container made of a laminate film with a thickness of 0.5 mm or less or a metal container with a thickness of 1 mm or less may be used. The thickness of the metal container is more preferably 0.5 mm or less.

Examples of the shape of the container include a flat type (thin type), angular type, cylinder type, coin type and button type. As the package member, an appropriate one may be selected corresponding to the dimension of the battery. Examples of the container include package members for miniature batteries to be mounted in, for example, mobile electronic devices or containers for large batteries to be mounted on two-wheel or four-wheel vehicles.

As the laminate film, a multilayer film prepared by interposing a metal layer between resin layers is used. Preferably, the metal layer is formed of an aluminum foil or aluminum alloy foil to reduce the weight of the battery. High-molecular materials such as a polypropylene (PP), polyethylene (PE), nylon and polyethylene terephthalate (PET) may be used as the resin layer. The laminate film can be molded into the form of the container by sealing through thermal fusion.

The metal container is made of aluminum, an aluminum alloy or the like. The aluminum alloy containing one or more elements selected from magnesium, zinc, and silicon is preferably used. When the alloy contains transition metals such as iron, copper, nickel and chromium, the amount of the transition metals is preferably 100 mass-ppm or less.

Figure 2:
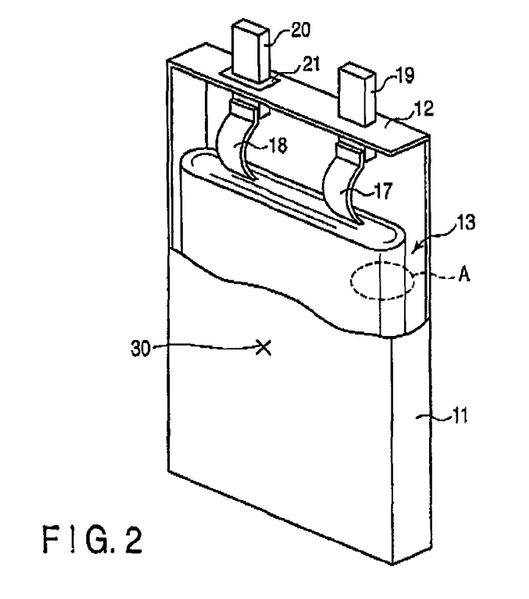
FIG. 2 is a partially broken side view of a battery according to an embodiment.
Figure 3:
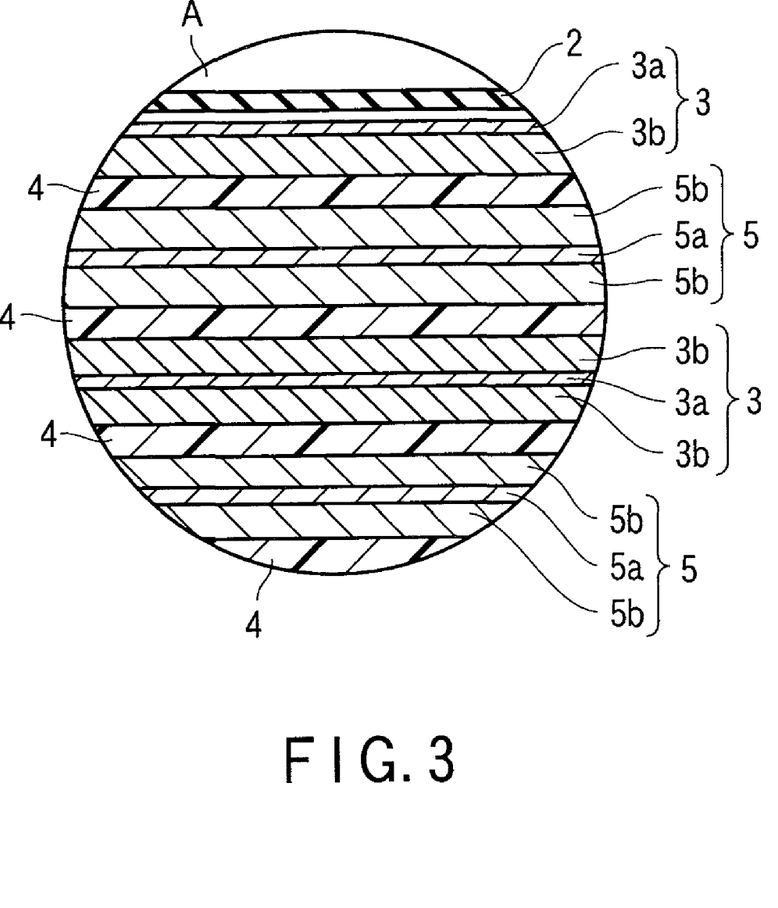
FIG. 3 is an enlarged sectional view of the part A of FIG. 2.

Next, an example of the nonaqueous electrolyte secondary battery according to the embodiment will be explained in detail with reference to FIG. 2 and FIG. 3. FIG. 2 is a partially broken perspective view of a thin-type nonaqueous electrolyte secondary battery provided with a package member made of a laminate film. FIG. 3 is an enlarged sectional view of the part A shown in FIG. 2. In this case, each of these drawings is a schematic view for explanations and promotion of the understanding of the embodiment. Though there are parts different from an actual device in shape, dimension and ratio, these structural designs may be properly changed taking the following explanations and known technologies into consideration.

In the thin-type nonaqueous electrolyte secondary battery shown in FIG. 2, a flat-type coil electrode group 13 is accommodated in a rectangular container 11. The container is made of a laminate film obtained by interposing an aluminum foil between two resin layers.

The coil electrode groups 13 having a flat form are formed by laminating a negative electrode 3, a separator 4, a positive electrode 5 and a separator 4 in this order from the outside to obtain a laminate, by spirally coiling the laminate, and by press-molding the coiled laminate.

A negative electrode tab 18 is formed in such a manner that one end thereof is connected to a negative electrode collector 3a and the other is connected to a, negative electrode terminal 20 secured to a rectangular lid 12 with a negative electrode gasket disposed therebetween. A positive electrode tab 17 is formed in such a manner that one end thereof is connected to a positive electrode current collector 5a and the other is connected to a positive electrode terminal 19 secured to a rectangular lid 12.

For example, a nonaqueous electrolytic solution is injected from the opening part of the rectangular container 11 and accommodated in the rectangular container 11. The opening part of the rectangular container 11 is closed with the rectangular lid 12 by heat sealing to thereby seal the coil electrode group 13 and liquid nonaqueous electrolytic solution.

As the negative electrode tab, for example, a material having electric stability and conductivity at a potential range from 1.0 to 3.0 V with respect to a lithium ion metal may be used. Specific examples of the material used for the negative electrode tab include aluminum and aluminum alloys containing elements such as Mg, Ti, Zn, Mn, Fe, Cu and Si. The negative electrode tab is preferably made of the same material as the negative electrode current collector to reduce the contact resistance with the negative electrode current collector.

As the positive electrode tab, for example, a material having electric stability and conductivity at a potential range from 3.0 to 4.25 V with respect to a lithium ion metal may be used. Specific examples of the material used for the positive electrode tab include aluminum and aluminum alloys containing elements such as Mg, Ti, Zn, Mn, Fe, Cu and Si. The positive electrode tab is preferably made of the same material as the positive electrode current collector to reduce the contact resistance with the positive electrode current collector.

According to the embodiment, a nonaqueous electrolyte secondary battery which is highly safe and has a large energy density can be provided by using the lithium-titanium complex oxide and lithium-containing phosphorous oxide as the negative electrode active material.

(Second Embodiment)

A battery pack according to a second embodiment comprises one or more of the nonaqueous electrolyte batteries as unit cells according to the above first embodiment. When the battery pack includes two or more unit cells, these unit cells are disposed in such a manner that they are electrically connected in series or in parallel to constitute a battery module.

An example of the battery pack according to the second embodiment will be explained with reference to FIG. 4 and FIG. 5.

Figure 4:
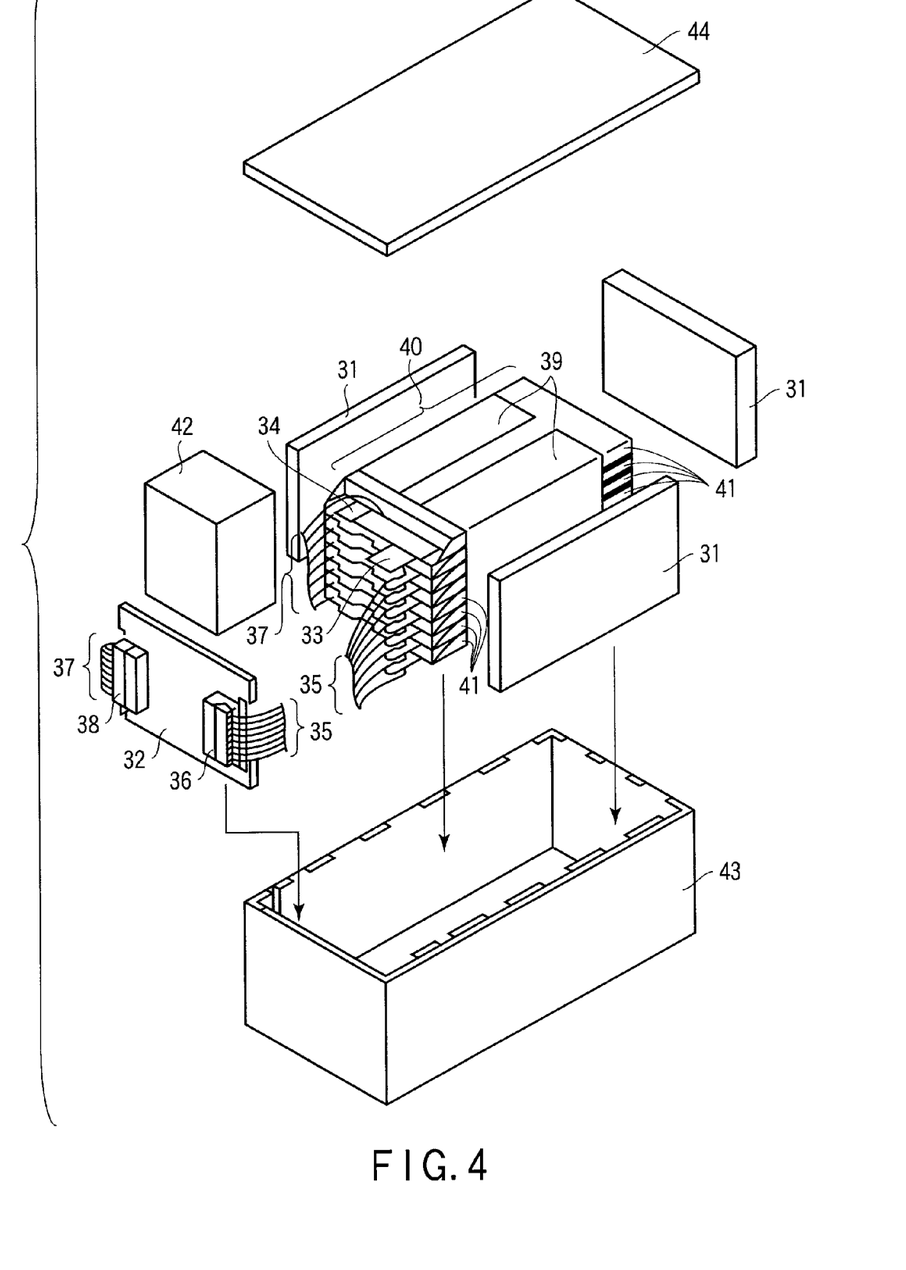
FIG. 4 is an exploded perspective view of a battery pack according to a second embodiment.

FIG. 4 is an exploded perspective view of the battery pack according to the second embodiment.

As shown in FIG. 4, a plurality of flat unit cells 41 (for example, 8 cells) are laminated in the direction of the thickness to form a battery laminate 40, that is, a battery module having a rectangular parallelopiped form. From each unit cell 41, as mentioned above, a positive electrode terminal 33 and a negative electrode terminal 34 which are connected to the positive electrode and negative electrode respectively are drawn out of the container. A print wiring board 32 is disposed on the side surface from which the positive electrode terminal 33 and negative electrode terminal 34 are projected.

The positive electrode terminal 33 is electrically connected to a positive electrode side connector 36 through a positive electrode side wiring 35. The negative electrode terminal 34 is electrically connected to a negative electrode side connector 38 through a negative electrode side wiring 37.

The laminate 40 of the unit cell 41 is secured by an adhesive tape 39. A protective sheet 31 made of a rubber or resin is disposed on each of three side surfaces on each side surface except for the side surface from which the positive electrode terminal 33 and negative electrode terminal 34 are projected. A block-shaped protective block 42 made of a rubber or resin is disposed between the side surface from which the positive electrode terminal 33 and negative electrode terminal 34 axe projected and the print wiring board 32.

This laminate 40 is accommodated in a receiving container 43 together with each protective sheet 31, protective block 42 and print wiring board 32. A lid 44 is attached to the upper surface of the receiving container 43.

Each structure will be explained in detail.

Figure 5:
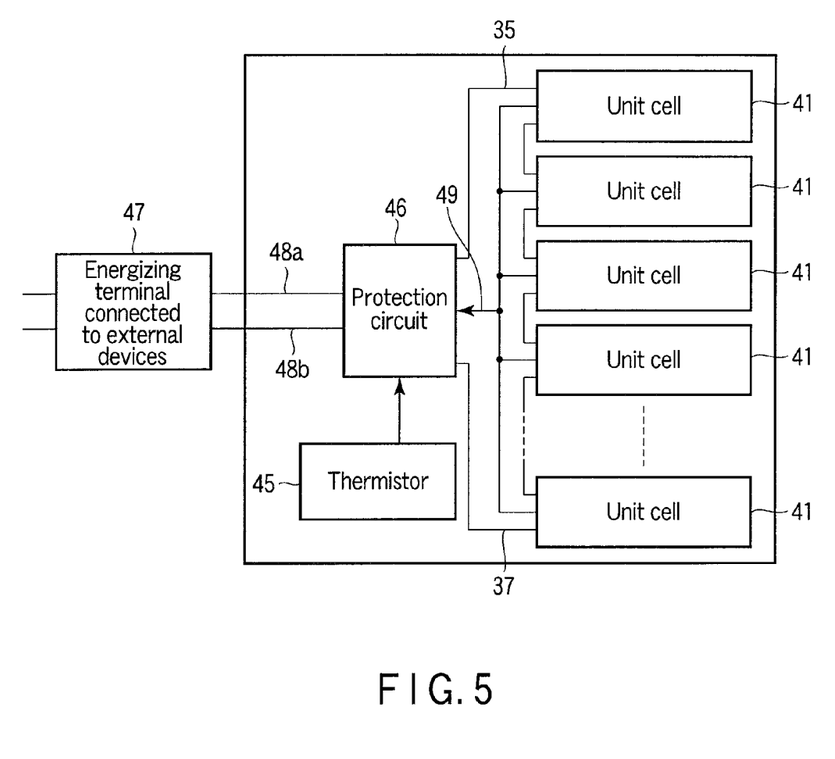
FIG. 5 is a block diagram illustrating an electric circuit of a battery pack according to a second embodiment.

As shown in FIG. 5, a thermistor 45, protection circuit 46 and an energizing terminal 47 connected to external devices are mounted on the print wiring board 32.

The thermistor 45 serves to detect the temperature of the unit cell 41 and the detected signals are transmitted to the protection circuit 46.

As shown in FIG. 5, the protection circuit 46 can cut off wirings 48a and 48b which connect the protection circuit 46 and the energizing terminal 47 connected to external devices, in a predetermined condition. The predetermined condition means, for example, the case where the temperature detected by the thermistor 45 is above a predetermined one and the case of detecting over-charge, over-discharge and over-current of the unit cell 41. The detection of this overcharge is made for individual unit cells 41 or whole unit cells 41. When individual unit cells 41 are detected, either the voltage of the battery may be detected or the potential of the positive electrode or negative electrode may be detected. In the latter case, a lithium electrode used as a reference electrode is inserted between individual unit cells 41. In the case of FIG. 5, the protection circuit 46 is provided with a battery voltage monitoring circuit section. The battery units 41 are respectively connected to the battery voltage monitoring circuit section through a wiring 49. This structure enables the protection circuit 46 to detect each battery voltage of the unit cells 41.

A thermally contracting tape may be used in place of the adhesive tape 39. In this case, after the protective sheet 31 is disposed on each side of the laminate 40 and the thermally contracting tubes are wound around the laminate, the thermally contracting tubes are contracted by heating to fasten the laminate 40.

Though the unit cells 41 shown in FIG. 4 are connected in series, they may be connected in parallel to increase the capacity of the battery pack. The assembled battery packs may be, of course, connected in series or parallel. Further, the structure of the battery pack is appropriately changed according to its use.

According to the embodiment, a battery pack which is highly safe and has a large energy density can be provided.

(Third Embodiment)

A vehicle according to a third embodiment is provided with a battery pack according to the second embodiment. Examples of the vehicle so-called here include two- to four-wheel vehicles hybrid electric cars, two- to four-wheel electric cars and assist bicycles.

Figure 6:
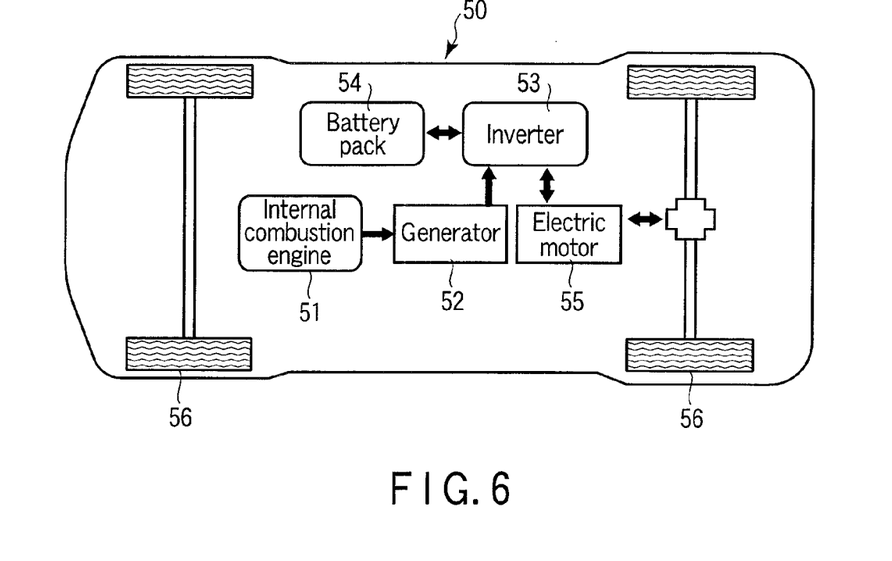
FIG. 6 is a schematic view illustrating a series hybrid car according to a third embodiment.
Figure 7:
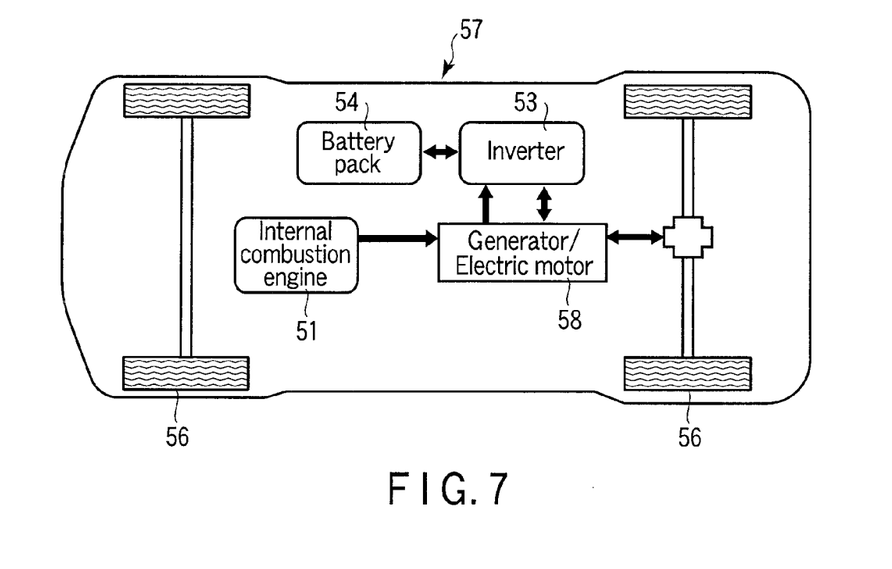
FIG. 7 is a schematic view illustrating a parallel hybrid car according to a third embodiment.
Figure 8:
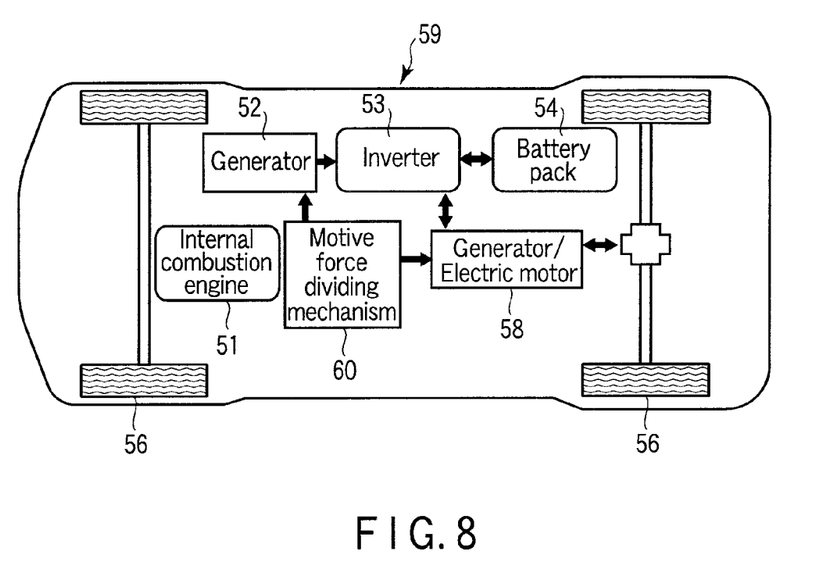
FIG. 8 is a schematic view illustrating a series-parallel hybrid car according to a third embodiment.

FIG. 6 to FIG. 8 show a hybrid-type vehicle utilizing a combination of an internal combustion engine and a battery drive electric motor as the running power source. As the driving force of a vehicle, a power source enabling a wide range of rotations and torque is required corresponding to the running conditions of the vehicle. Generally, internal combustion engines are limited in torque/number of rotations at which ideal energy efficiency is obtained and therefore, the energy efficiency is reduced in the operating conditions other than the above specified condition. The hybrid-type vehicles are characterized by the feature that the internal combustion engine is operated in the optimum condition to generate electricity and also, the wheels are driven by a highly efficient electric motor, or the motive forces of the internal combustion engine and the electric motor are combined to drive, thereby enabling an improvement in energy efficiency. Further, kinetic energy given by the vehicle is recovered as electric power when the vehicle is decelerated, ensuring that the mileage per unit fuel can be increased more significantly than a usual vehicle driven only by an internal combustion engine.

The hybrid vehicles may be largely classified into three categories based on how to combine an internal combustion engine and an electric motor.

FIG. 6 shows a hybrid vehicle 50 generally called a series hybrid vehicle. The motive force of an internal combustion engine 51 is all converted once into electric power by a generator 52 and this electric power is stored in a battery pack 54 through an inverter 53. As the battery pack 54, a battery pack according to the second embodiment is used. The electric power of the battery pack 54 is supplied to an electric motor 55 through an inverter 53 and a wheel 56 is driven by the electric motor 55. This is a system combining a generator in an electric vehicle. The internal combustion engine can be operated in a highly efficient condition and the power can be recovered. On the contrary, the wheel can be driven only by an electric motor and a high-output electric motor is therefore required. Further, as to the battery pack, one having a relatively large capacity is required. The rated capacity of the battery pack is preferably in a range from 5 to 50 Ah and more preferably in a range from 10 to 20 Ah. Here, the rated capacity means a capacity obtained when discharged at 0.2 C rate.

FIG. 7 shows a hybrid vehicle 57 called a parallel hybrid vehicle. The symbol 58 shows an electric motor doubling as a generator. An internal combustion engine 51 mainly drives a wheel 56 and a part of the motive force is converted into electric power by the generator 58 and the battery pack 54 is charged by the electric power though this depends on the case. When the vehicle is started or accelerated which is accompanied by increase in load, the motive force is supplemented by the electric motor 58. This is based on a usual vehicle and is a system which is reduced in a variation of the load of the internal combustion engine 51 to thereby obtain high efficiency and also ensures power recovery. Because the wheel 56 is driven mainly by the internal combustion engine 51, the output of the electric motor 58 can be arbitrarily determined according to the ratio of the aid to the drive force. The system can be constituted even using a relatively small electric motor 58 and a battery pack 54 having a relatively low capacity. The rated capacity of the battery pack may be in a rage from 1 to 20 Ah and more preferably 5 to 10 Ah.

FIG. 8 shows a hybrid vehicle 59 called a series-parallel hybrid vehicle. This is a system comprising a combination of series and parallel assemblies. A motive force dividing mechanism 60 divides the output of the internal combustion engine 51 into a generating use and a traction use. The engine load is controlled more carefully than in the case of a parallel system, making possible to improve energy efficiency.

The rated capacity of the battery pack is preferably in a range from 1 to 20 Ah and more preferably in a range from 5 to 10 Ah.

The rated voltage of a battery pack to be mounted on a hybrid vehicle as shown in FIG. 6 to FIG. 8 is desirably in a range from 200 to 600 V.

Figure 9:
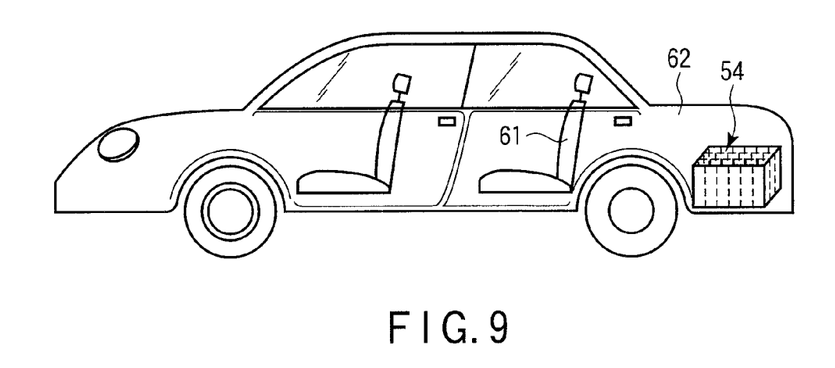
FIG. 9 is a schematic view illustrating a vehicle according to a third embodiment.

The battery pack 54 is usually disposed in a place where it is scarcely affected by the influence of a variation in atmospheric temperature and by impacts of collision and the like. In a sedan-type vehicle as shown in, for example, FIG. 9, the battery pack may be disposed in a trunk room 62 at the rear of the backseat 61. The battery pack may be disposed under or behind the seat 61. In the case where the battery has a large weight, it is preferable to dispose the battery pack under the seat or floor to lower the center of the gravity of the whole vehicle.

According to the embodiment, a vehicle equipped with a battery pack which is highly safe and has a large energy density can be provided.

EXAMPLES

The embodiment will be explained in more detail by way of examples.

Example 1

<Production of a Positive Electrode>

$LiNiO_2$ (lithium-deintercalation capacity in the first charge: 215 mAh/g, lithium-intercalation capacity in the first discharge: 180 mAh/g) was used as the positive electrode active material. Graphite and acetylene black were used as the conductive agents. PVdF was used as the binder.

88 parts by mass of $LiNiO_2$, 3 parts by mass of graphite, 4 parts by mass of acetylene black and 5 parts by mass of PVdF were added to N-methylpyrrolidone (NMP) and these components were mixed to prepare a slurry. This slurry was applied to both surfaces of an aluminum foil (current collector) 15 µm in thickness and dried, followed by pressing to mold, thereby producing a positive electrode in which an active material-containing layer having a thickness of 28 µm was formed on each surface of the current collector.

<Production of a Negative Electrode>

$Li_4Ti_5O_{12}$ (lithium-intercalation capacity in the first charge: 160 mAh/g, lithium-deintercalation capacity in the first discharge: 152 mAh/g) and $FePO_4$ (lithium-intercalation capacity: 189 mAh/g) were used as the negative electrode active materials. Graphite was used as the conductive agent. PVdF was used as the binder. $FePO_4$ was made to support 3% of carbon based on the mass thereof.

84 parts by mass of $Li_4Ti_5O_{12}$, B parts by mass of $FePO_4$, 3 parts by mass of graphite, and 5 parts by mass of PVdF were added to N-methylpyrrolidone (NMP) and these components were mixed to prepare a slurry. This slurry was applied to both surfaces of an aluminum foil (current collector) 15 µm in thickness and dried, followed by pressing to mold, thereby producing a negative electrode in which an active material-containing layer having a thickness of 35 µm was formed on each surface of the current collector.

<Preparation of a Liquid Nonaqueous Electrolyte>

Ethylene carbonate (EC), propylene carbonate (PC), and Y-butyrolactone (GBL) were mixed in a ratio by volume of 1:1:4 to prepare a mixture solvent. 2 M of $LiBF_4$ was dissolved in this mixture solvent to prepare a nonaqueous electrolyte.

<Fabrication of a Battery>

A 0.3-mm-thick aluminum container having a bottomed rectangular cylinder form was prepared. An aluminum lid which was fitted with a positive electrode terminal and a negative electrode terminal by caulking with an insulating resin disposed therebetween was prepared. A separator made of a polyethylene porous film was impregnated with the nonaqueous electrolyte. Each surface of the positive electrode was coated with this separator. Then, the negative electrode was overlapped the separator so as to put the separator between the positive electrode and the negative electrode thereby obtained a laminate. The laminate was then coiled to obtain a spiral electrode group provided with lead tabs extended from each of the positive electrode and negative electrode. This electrode group was molded into a flat form by pressing. The positive electrode tab of the electrode group was connected to one end of the positive electrode terminal of the lid. The negative electrode tab was connected to one end of the negative electrode terminal. The electrode group was inserted into the container together with the lid through the opening part of the container and the lid was fitted to the opening part of the container by welding. A thin-type nonaqueous electrolyte secondary battery having the structure shown in FIG. 2 and a thickness of 3.0 mm, a width of 35 mm and a height of 62 mm was produced by these steps.

The nonaqueous electrolyte secondary battery produced in this manner had the following characteristics; $\gamma/\beta=0.095$ and $(ay\ bx)/bz=0.114$, which satisfied the requirement of the above equation (5).

Example 2

A battery was manufactured in the same manner as in Example 1 except that $LiNi_{0.81}Co_{0.16}Al_{0.03}O_2$ (lithium-deintercalation capacity in the first charge: 209 mAh/g, lithium-intercalation capacity in the first discharge: 175 mAh/g) was used as the positive electrode active material.

The nonaqueous electrolyte secondary battery of Example 2 had the following characteristics: $\gamma/\beta=0.095$ and $(ay-bx)/bz=0.114$, which satisfied the requirement of the above equation (5).

Example 3

$Li_4Ti_5O_{12}$ (lithium-intercalation capacity in the first charge: 160 mAh/g, lithium-deintercalation capacity in the first discharge: 152 mAh/g) and $CoPO_4$ (lithium-intercalation capacity: 185 mAh/g) were used as the negative electrode active materials. Graphite was used as the conductive agent. PVdF was used as the binder. $CoPO_4$ was made to support 3% of carbon based on the mass thereof.

84 parts by mass of $Li_4Ti_5O_{12}$, 8 parts by mass of $CoPO_4$, 3 parts by mass of graphite, and 5 parts by mass of PVdF were added to N-methylpyrrolidone (NMP) and these components were mixed to prepare a slurry. This slurry was applied to both surfaces of an aluminum foil (current collector) 15 μm in thickness and dried, followed by pressing to mold, thereby producing a negative electrode in which an active material-containing layer having a thickness of 35 μm was formed on each, surface of the current collector. A battery was manufactured in the same manner as in Example 1 except for the above processes.

The nonaqueous electrolyte secondary battery of Example 3 had the following characteristics: $\gamma/\beta=0.095$ and $(ay-bx)/bz-0.117$, which satisfied the requirement of the above equation (5).

Example 4

$Li_4Ti_5O_{12}$ (lithium-intercalation capacity in the first charge: 160 mAh/g, lithium-deintercalation capacity in the first discharge: 152 mAh/g) and $Fe_{0.5}Mn_{0.5}PO_4$ (lithium-intercalation capacity: 189 mAh/g) were used as the negative electrode active materials. Graphite was used as the conductive agent. PVdF was used as the binder. $Fe_{0.5}Mn_{0.5}PO_4$ was made to support 3% of carbon based on the mass thereof.

84 parts by mass of $Li_4Ti_5O_{12}$, 8 parts by mass of $Fe_{0.5}Mn_{0.5}PO_4$, 3 parts by mass of graphite, and 5 parts by mass of PVdF were added to N-methylpyrrolidone (NMP) and these components were mixed to prepare a slurry. This slurry was applied to both surfaces of an aluminum foil (current collector) 15 μm in thickness and dried, followed by pressing to mold, thereby producing a negative electrode in which an active material-containing layer having a thickness of 35 μm was formed on each surface of the current collector. A battery was manufactured in the same manner as in Example 1 except for the above processes.

The nonaqueous electrolyte secondary battery of Example 4 had the following characteristics: $\gamma/\beta-0.095$ and $(ay-bx)/bz=0.114$, which satisfied the requirement of the above equation (5).

Example 5

$Li_4Ti_5O_{12}$ (lithium-intercalation capacity in the first charge: 160 mAh/g, lithium-deintercalation capacity in the first discharge: 152 mAh/g) and $MnPO_4$ (lithium-intercalation capacity: 190 mAh/g) were used as the negative electrode active materials. Graphite was used as the conductive agent. PVdF was used as the binder. $MnPO_4$ was made to support 3% of carbon based on the mass thereof.

84 parts by mass of $Li_4Ti_5O_{12}$, 8 parts by mass of $MNPO_4$, 3 parts by mass of graphite, and 5 parts by mass of PVdF were added to N-methylpyrrolidone (NMP) and these components were mixed to prepare a slurry. This slurry was applied to both surfaces of an aluminum foil (current collector) 15 μm in thickness and dried, followed by pressing to mold, thereby producing a negative electrode in which an active material-containing layer having a thickness of 35 μm was formed on each surface of the current collector. A battery was manufactured in the same manner as in Example 1 except for the above processes.

The nonaqueous electrolyte secondary battery of Example 5 had the following characteristics: $\gamma/\beta=0.095$ and $(ay-bx)/bz=0.113$, which satisfied the requirement of the above equation (5).

Example 6

A battery was manufactured in the same manner as in Example 1 except that $LiNi_{0.80}Co_{0.15}Al_{0.05}O_2$ (lithium-deintercalation capacity in the first charge: 207 mAh/g, lithium-intercalation capacity in the first discharge: 173 mAh/g) was used as the positive electrode active material.

The nonaqueous electrolyte secondary battery of Example 6 had the following characteristics: $\gamma/\beta=0.095$ and $(ay-bx)/bz=0.116$, which satisfied the requirement of the above equation (5).

Example 7

A battery was manufactured in the same manner as in Example 1 except that $LiNi_{0.84}Co_{0.15}Al_{0.01}O_2$ (lithium-deintercalation capacity in the first charge: 210 mAh/g, lithium-intercalation capacity in the first discharge: 176 mAh/g) was used as the positive electrode active material.

The nonaqueous electrolyte secondary battery of Example 7 had the following characteristics: $\beta/\gamma=0.095$ and $(ay-bx)/bz=0.113$, which satisfied the requirement of the above equation (5).

Example 8

A battery was manufactured in the same manner as in Example 1 except that $LiNi_{0.85}Co_{0.15}O_2$ (lithium-deintercalation capacity in the first charge: 211 mAh/g, lithium-intercalation capacity in the first discharge: 178 mAh/g) was used as the positive electrode active material.

The nonaqueous electrolyte secondary battery of Example 8 had the following characteristics: $\gamma/\beta=0.095$ and $(ay-bx)/bz=0.107$, which satisfied the requirement of the above equation (5).

Comparative Example 1

A battery was manufactured in the same manner as in Example 1 except that $Li_4Ti_5O_{12}$ was used as the negative electrode active material and a negative electrode having a composition containing 89 parts by mass of $Li_4Ti_5O_{12}$, 6 parts by mass of graphite and 5 parts by mass of PVdF was used.

Comparative Example 2

A battery was manufactured in the same manner as in Example 2 except that $Li_4Ti_5O_{12}$ was used as the negative electrode active material and a negative electrode having a composition containing 89 parts by mass of $Li_4Ti_5O_{12}$, 6 parts by mass of graphite and 5 parts by mass of PVdF was used.

Comparative Example 3

A battery was manufactured in the same manner as in Example 1 except that meso-phase carbon pitch fiber (MCF) was used as the negative electrode active material and a negative electrode having a composition containing 75 parts by mass of MCF, 20 parts by mass of graphite and 5 parts by mass of PVdF was used.

(Measurement of the Mass Energy Density)

With regard to the thin-type nonaqueous electrolyte secondary batteries of Examples 1 to 8 and Comparative Examples 1 to 3, the mass energy density of each battery was measured by the following method. Further, each battery was subjected to an external short circuit test using the nail penetration method in a fully charged state. The results are shown in the following Table 1.

The battery was made to charge at 1/20 C rate until the battery voltage reached 2.8 V (Examples 1 to 8 and Comparative Examples 1 and 2) or 4.2 V (Comparative Example 3). Subsequently, the battery was made to discharge at 1/20 C rate until the battery voltage reached 1.5 V (Examples 1 to 8 and Comparative Examples 1 and 2) or 3 V (Comparative Example 3) and the quantity [Wh] of discharge was measured. The quantity [Wh] of discharge was divided by the weight (g) of the battery to obtain the mass energy density of the battery. In the external short circuit test, the temperature was measured at the part indicated by the symbol×(30) on the surface of the rectangular container.

TABLE 1

| | Mass energy density [W/kg] | Results of external short circuit test |
|---|---|---|
| Example 1 | 104 | Only generation of heat (maximum 85° C.) |
| Example 2 | 104 | Only generation of heat (maximum 80° C.) |
| Example 3 | 104 | Only generation of heat (maximum 85° C.) |
| Example 4 | 104 | Only generation of heat (maximum 86° C.) |
| Example 5 | 104 | Only generation of heat (maximum 85° C.) |
| Example 6 | 104 | Only generation of heat (maximum 78° C.) |
| Example 7 | 103 | Only generation of heat (maximum 81° C.) |
| Example 8 | 104 | Only generation of heat (maximum 86° C.) |
| Comparative Example 1 | 100 | Only generation of heat (maximum 86° C.) |
| Comparative Example 2 | 101 | Only generation of heat (maximum 82° C.) |
| Comparative Example 3 | 140 | Generation of heat and battery swelling caused by vaporization of the electrolytic solution (maximum 190° C.) |

As is clear from the above Table 1, each battery of Examples 1 to 8 using a lithium-nickel complex oxide as the positive electrode active material and a lithium-containing phosphorous oxide together with a lithium-titanium complex oxide as the negative electrode active material has a higher energy density than each battery of Comparative Examples 1 and 2 using only a lithium-titanium complex oxide as the negative electrode active material.

Further, in the external short circuit test, each battery of Examples 1 to 8 had a lower maximum temperature than each battery of Comparative Examples 1 and 2. It was shown that the addition of the lithium-containing phosphorous oxide as the negative electrode active material gave no influence an the safety of the battery.

In the battery of Comparative Examples 3 using a lithium-nickel complex oxide as the positive electrode active material and MCF as the negative electrode active material, large generation of heat was observed and battery swelling caused by the vaporization of the electrolytic solution was confirmed in the external short circuit test, showing that the battery had low safety, though it had a large mass energy density.

Although the aforementioned examples show the case of applying the embodiment to a thin-type nonaqueous electrolyte secondary battery, the embodiment may be likewise applied to a cylinder-type nonaqueous electrolyte secondary battery, angular-type nonaqueous electrolyte secondary battery and the like. Further, the electrode group accommodated in the battery container is not limited to a structure having a spiral form but may have a structure in which a plurality of combinations of the positive electrode, separator and negative electrode which are laminated in this order are stuck.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery comprising a positive electrode comprising a lithium-nickel complex oxide, a negative electrode comprising a lithium-titanium complex oxide and a lithium-containing phosphorous oxide, and a nonaqueous electrolyte, the battery satisfying the following equations (1) to (5):

$$b/a < y/x \quad (1)$$

$$75 \leq b/a \leq 90 \quad (2)$$

$$90 \leq y/x \leq 100 \quad (3)$$

$$x < z \quad (4)$$

$$0 < \gamma/\beta \leq (ay - bx)/bz \quad (5)$$

where;
a is a lithium-deintercalation capacity [mAh/g] of the lithium-nickel complex oxide in the first charge;
b is a lithium-intercalation capacity [mAh/g] of the lithium-nickel complex oxide in the first discharge;
x is a lithium-intercalation capacity [mAh/g] of the lithium-titanium complex oxide in the first charge;
y is a lithium-deintercalation capacity [mAh/g] of the lithium-titanium complex oxide in the first discharge;
z is a lithium-intercalation capacity [mAh/g] of the lithium-containing phosphorous oxide;
β a is a mass [g] of the lithium-titanium complex oxide; and
γ is a mass [g] of the lithium-containing phosphorous oxide;
wherein
the lithium-titanium complex oxide is lithium titanate having a spinel structure represented by the formula $Li_{4+x}Ti_5O_{12}$,
the lithium-containing phosphorous oxide is at least one oxide selected from $Li_sFe_{1-t}Mn_tPO_4$, and $Li_sCoPO_4$ and has an olivine structure,
wherein
x is from −1 to 3,
s is from greater than 0 to 1.15,
t is from 0 to 1, and
s is from greater than 0 to 1.15.

2. The battery according to claim 1, wherein the nonaqueous electrolyte comprises propylene carbonate.

3. The battery according to claim 1, wherein the negative electrode further comprises carbon which is to be carried on the lithium-containing phosphorous oxide.

4. A battery pack comprising one or more of the nonaqueous electrolyte batteries according to claim 1.

5. A vehicle comprising the battery pack according to claim 4.

* * * * *